United States Patent [19]
Allen et al.

[11] Patent Number: 5,836,492
[45] Date of Patent: *Nov. 17, 1998

[54] TIRE MOUNTABLE FOLDING CARRIER

[75] Inventors: Richard A. Allen; Alexander R. Allen; Christopher B. Allen, all of Concord, Mass.

[73] Assignee: R. A. Allen Company, Inc., Lincoln, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 740,133

[22] Filed: Oct. 24, 1996

[51] Int. Cl.$^6$ ........................................................ B60R 9/10
[52] U.S. Cl. .................... 224/493; 224/42.26; 224/924
[58] Field of Search ............................... 224/493, 42.13, 224/511, 512, 514, 42.26, 924

[56] References Cited

U.S. PATENT DOCUMENTS

| | | | |
|---|---|---|---|
| 4,392,597 | 7/1983 | Traugh | 224/42.13 |
| 4,518,108 | 5/1985 | Allen | 224/314 |
| 4,709,840 | 12/1987 | Allen | 224/493 X |
| 5,007,567 | 4/1991 | Foster | 224/42.13 |
| 5,085,360 | 2/1992 | Fortune et al. | 224/42.13 |
| 5,215,232 | 6/1993 | Wyers | 224/42.13 |

*Primary Examiner*—Renee S. Luebke
*Attorney, Agent, or Firm*—Herbert L. Bello

[57] ABSTRACT

A foldable carrier that is mountable upon a motor vehicle having an externally-mounted spare tire and brake light support assembly includes rotatably connected frame, a carrying member, and a supporting member. The carrying and supporting members are constrained for limited rotational movement relative to the frame between an operational position and a stored position. The carrying member has a pair of carrying arms, a connecting member and a pair of inwardly extending feet. The feet, the connecting member and a portion of the carrying arms disposed between the feet and connecting member form a substantially C-shaped opening that permits the carrier to be mounted on the vehicle about the spare tire without interferring with the brake light support.

16 Claims, 3 Drawing Sheets

TIRE MOUNTABLE FOLDING CARRIER

BACKGROUND OF THE INVENTION

1. Field of the Invention

The present invention relates to carriers that are configured to be attached to motor vehicles. More particularly, the invention is directed towards carriers that can be mounted on motor vehicles having an externally-mounted spare tire.

2. Description of the Prior Art

A variety of collapsible bicycle carriers that are configured to be mounted on motor vehicles are available in the prior art. Examples of carriers which are mountable on automobiles are shown in U.S. Pat. Nos. 4,518,108 and 4,709,840.

Typically, collapsible carriers are configured to be mountable over the trunk, or rear hood, assembly of a motor vehicle. Such carriers generally include a pair of carrying arms that are pivotally mounted on a frame structure. To use these carriers, the carrying arms are first moved to an extended position. Bicycles, or other items, are then positioned on the extended carrying arms and secured thereto using, for example, a pair of straps.

Those carriers currently available in the prior art can be mounted on a wide variety of motor vehicles. However, it can be difficult to mount and use available carriers in connection with sport utility vehicles having externally-mounted spare tires and high-mounted brake light support assemblies. One source of difficulty is due to the fact that presently available carriers are not designed to be easily mounted to vehicles with such spare tire and brake light support assemblies. Oftentimes, the width of the carrier is insufficient to span the face of externally-mounted spare tire. Furthermore, on certain vehicles, the brake light support prevents the carrier from being positioned behind the tire. As a result of these limitations, when such carriers are used in connection with sport utility vehicles, they cannot be properly mounted and present a potentially dangerous situation.

A need has arisen for a collapsible bicycle carrier which can be attached to vehicles having externally-mounted tires. Furthermore, a need exists for a carrier that can be mounted on a motor vehicle having an externally-mounted tire, but which will not compromise the operation of the motor vehicle's brake lights.

SUMMARY OF THE INVENTION

It is an object of the present invention to provide a folding carrier which does not suffer from the foregoing disadvantages and limitations.

It is another object of the present invention to provide a folding carrier that can be attached to a motor vehicle having an externally-mounted tire.

It is a further object of the present invention to provide a carrier which, when attached to a motor vehicle, will not interfere with the motor vehicle's brake lights.

The carrier of the present invention is generally characterized by a frame, a carrying member, a supporting member, and a pair of locking elements. The carrying and supporting members are pivotally mounted to the frame and constrained for rotational movement between a collapsed stored position and an extended operational position. The carrying member is configured so that it can be directly attached to the externally-mounted tire of a motor vehicle. In operation, the locking elements secure the carrying member in its extended operational position. Preferably, the locking elements can be easily released so as to permit movement of the carrying member from its extended position to its collapsed position.

The frame member is a substantially U-shaped member having a cross-member and a pair of legs. The legs extend from opposite ends of the cross-member. The carrying member and supporting member are pivotally mounted on the legs of the frame member. The legs of the frame member can have a protective covering. When utilized, the protective covering typically is configured such that it provides a non-slip surface upon which items can be placed during operation of the carrier of the invention.

The carrying member typically is a multisectional, tubular member having a substantially H-shaped configuration. The carrying member includes a pair of arms and a connecting element. Each of the arms of the carrying member are pivotally connected to the frame member. The arms of the carrying member can be rotated about their pivotal connection to the frame member from a collapsed stored position to an extended operational position. The pivot points of the carrying arms are co-axial. The carrying member and frame member are connected in such a manner that, when the carrying member is rotated to its extended operational position, the carrying arms are oriented substantially perpendicular to the frame member. The carrying arms of the carrying member and the frame member are in substantially side-by-side relationship when the carrying member is in its collapsed stored position.

The connecting element extends between, and preferably interconnects, the arms of the carrying member. The connecting element has an intermediate portion and a pair of ends. Typically, one of the ends of the connecting element is secured to one of the carrying arms. The other end of the connecting element is generally connected to the other of the carrying arms. It is the interconnection of the connecting element and the carrying arms that gives the carrying member its substantially H-shaped configuration. The ends of the connecting element are preferably connected to each of the carrying arms at a location adjacent to the pivotal connection between the carrying arms and frame member. The intermediate portion extends between the two ends and preferably is sized and shaped so as to be capable of spanning at least a portion of the face of a tire mounted on the outside of the automobile. In operation, the connecting element acts to maintain the carrying arms in substantially parallel disposition.

Structurally, the carrying member is configured to be mounted to a spare tire mounted on the outside of the automobile. Each of the carrying arms generally include a foot which is configured to engage the inside of the sidewalls of the tire when the carrying member is in its extended, operative position. Together, the feet of the carrying arms and the connecting element define a substantially C-shaped opening that is sized and shaped to engage the tire without interfering with the high-mounted brake light of the motor vehicle.

The supporting member is a substantially U-shaped member having a rear foot bar and a pair of legs. The legs of the supporting member extend from opposite ends of the rear foot bar. As noted above, the supporting member is pivotally mounted on the frame member and constrained for limited rotational movement relative thereto between an extended, operative position and a collapsed, stored position. The supporting member and frame member are in substantially perpendicular relationship to one another when the supporting member is in its extended position. The supporting member and frame are in a substantially side-by-side relationship when the carrying member is in its collapsed position.

The support member is configured to support one end of the frame above an externally-mounted tire and its related support assembly. To accomplish this goal, each leg of the supporting member includes a foot portion that is configured to press against the frame member when the supporting member is in its operational, extended position. In operation, these foot portions prevent further relative movement when the support member. In addition, the rear foot bar of the supporting member is configured to contact the motor vehicle when the supporting member is in its operative, extended position. If desired, the supporting member can include a protective covering. The protective covering typically is configured so as to protect the supporting member against impact damage during operation of the carrier of the invention.

Each of the carrying arms can be secured in position with an independently actuated locking element. Each locking element includes an arm that is pivotally mounted to the frame member. Each arm is sized and shaped to be removably and replaceably positionable in an aperture in the carrying arms of the carrying member. In operation, each locking element functions to secure its respective carrying arm at a substantially perpendicular disposition relative to said frame member when the carrying arm is in its operative, extended position.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure. The scope of the invention is indicated in the claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
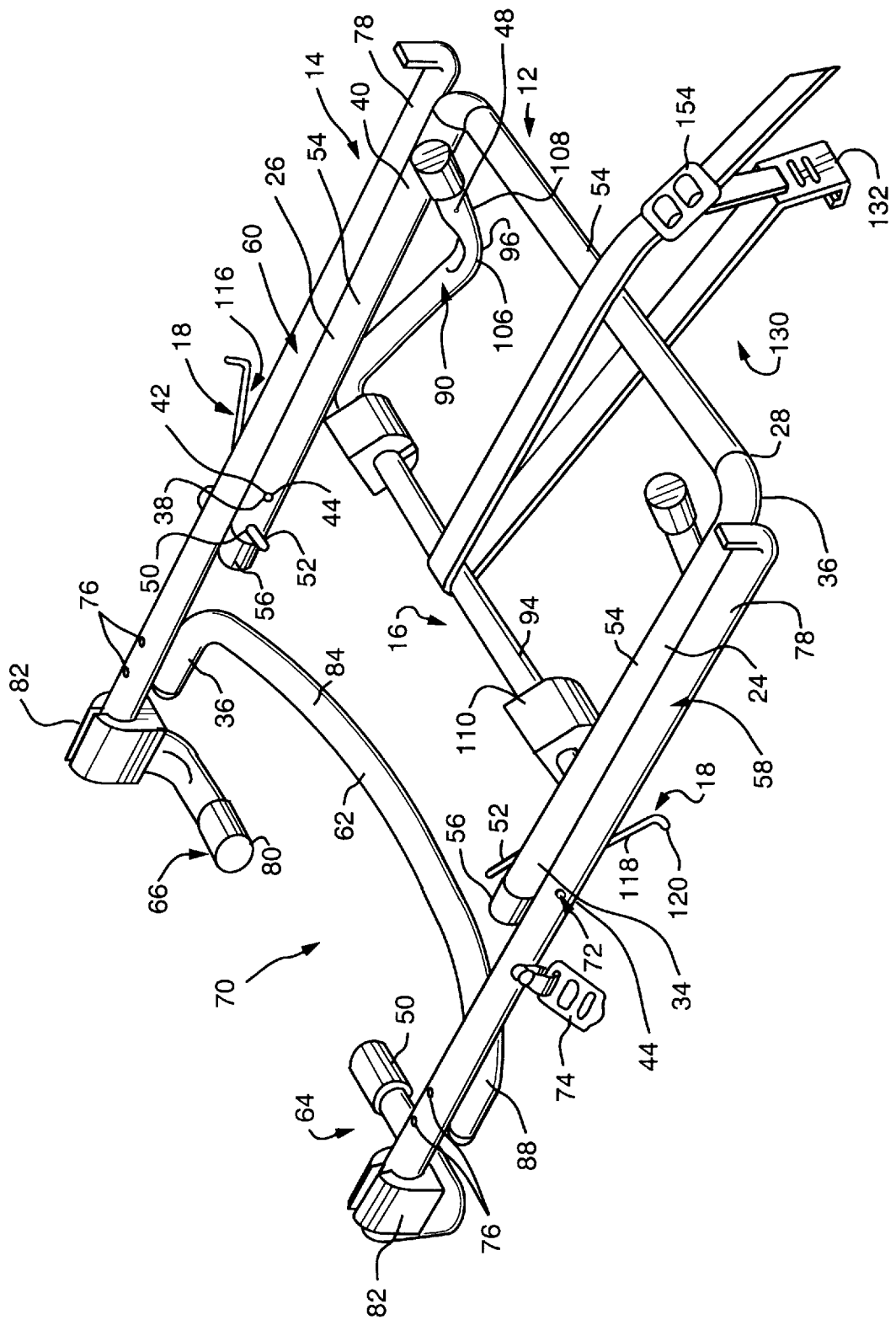
FIG. 1 is a perspective view of a foldable carrier embodying the invention in a collapsed, stored position.
Figure 2:
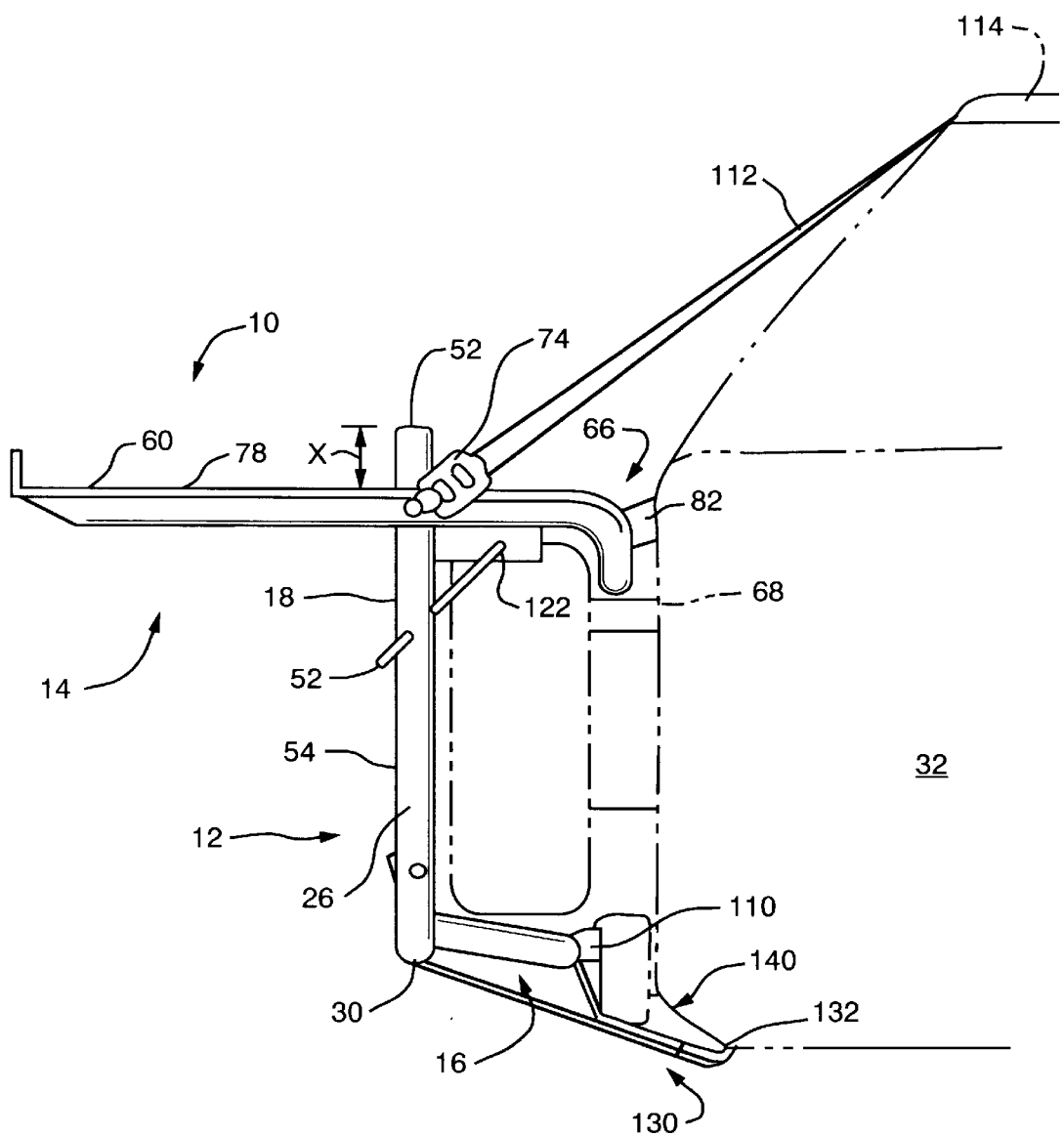
FIG. 2 is a side view of the carrier of FIG. 1 in its carrying position and attached to the externally-mounted tire of a motor vehicle; and, FIG. 3 is a perspective view of the carrier of FIG. 1 mounted on the externally-mounted tire of a motor vehicle.
Figure 3:
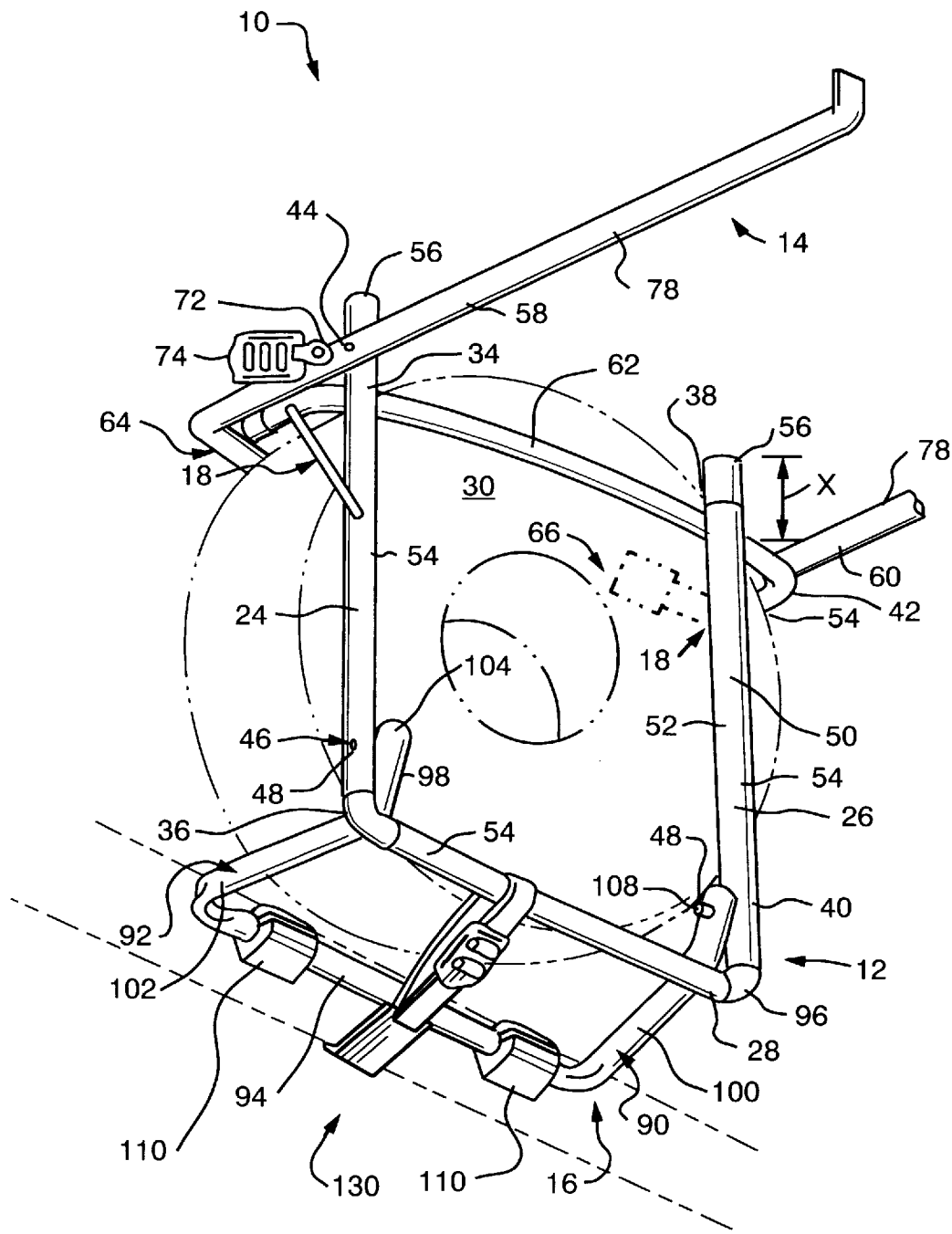

Referring to FIGS. 1 through 3, wherein like reference numerals refer to like parts, there is illustrated a foldable carrier 10. The foldable carrier 10 includes a carrying member 14 and a supporting member 16 rotatably mounted on a frame 12. The carrying member 14 and supporting member 16 are constrained for limited rotational movement relative to the frame 12 between extended, carrying positions and collapsed, stored positions. A pair of locking elements 18 are provided for locking the carrying member 14 in its extended, carrying position shown in FIG. 3.

The frame 12 is a substantially U-shaped member having a pair of legs 24, 26 and a cross-member 28. The legs 24, 26 and cross-member 28 are of sufficient size to provide mechanical support for the carrying member 14 and supporting member 16. Preferably, the legs 24 and 26 are spaced apart to span at a portion of the face of a tire 30 mounted on a motor vehicle 32.

As shown best in FIGS. 1 and 3, the carrying member 14 and supporting member 16 are rotationally connected to the legs 24 and 26 of the frame 12. The leg 24 has an upper portion 34 and a lower portion 36. Leg 26 has an upper portion 38 and a lower portion 40. Each of the upper portions 34 and 38 includes an aperture 42 sized to receive a pin, bolt or other fastener 44 which rotatably connects the frame 12 to the carrying member 14. As best shown in FIG. 3, the apertures 42 are positioned a distance "X" from the ends of the upper portions 34 and 38 of the legs 24 and 26. The distance "X" is selected such that upon rotation of the carrying member 14 to its extended position, a segment of the upper portions 34 and 38 will extend above the carrying member 14 thus providing a surface against which items placed on the foldable carrier 10 can rest. The lower portions 36 and 40 each include an aperture 46 sized to receive a pin, bolt or other fastener 48 which rotatably connects the frame 12 to the supporting member 16. The apertures 42 and 46 are positioned so as to form two parallel axis of rotation. Finally, the upper portions 34 and 38 also each include an aperture 50 sized to receive an end portion 52, described in detail below, of the locking element 18. The apertures 42, 46, and 50 are positioned so as to form three parallel axis of rotation. The frame 12 can be manufactured from virtually any strong durable material, such as aluminum, steel, or polymeric composites, preferably, aluminum tubing. A protective sleeve 54 composed of, for example, plastic or rubber, is fitted over the legs 24 and 26 and the cross member 28. A protective plastic cap 56 also composed of, for example, plastic or rubber, can be used to cover the ends of the frame 12 extending beyond the carrying member 14.

As shown in the several figures, the carrying member 14 typically is a multi sectional, tubular member having a substantially H-shaped configuration. The carrying member 14 includes a pair of arms 58, 60 and a connecting element 62. The arms 58 and 60 of the carrying member 14 are pivotally connected to the frame 12.

More particularly, the carrying member 14 is mounted to the frame 12 for rotational movement between an extended, operational position (FIGS. 2 and 3) and a collapsed, stored position (FIG. 1). In its extended, operational position as the carrying member 14 is oriented substantially perpendicular to the frame 12. In its collapsed, stored position, the carrying member 14 and frame 12 are in substantially side-by-side relationship.

The carrying arms 58 and 60 of the carrying member 14 are sized and shaped in such a manner that they are capable of engaging a tire 30 mounted on the outside of a motor vehicle 32. Carrying arms 58 and 60 include inwardly extending foot portions 64 and 66, respectively. In operation, these foot portions 64 and 66 engage the inner sidewalls 68 of the mounted tire 30 when the carrying member 14 is in its extended, operative position and mounted on the tire 30 of the motor vehicle 32. Together the foot portions 64, 66, a portion of the carrying arms 58, 60, and the connecting element 62 define a substantially C-shaped opening 70 which can fit over the tire 30 without interfering with the high-mounted brake light of the motor vehicle 32.

Each of the carrying arms 58, 60 also includes an aperture 72 for receiving the pin, bolt or other fastener 44 which rotatably connects the carrying member 14 to the frame 12. Accordingly, the apertures 72 are positioned such that upon assembly of the foldable carrier 10 they are in alignment with the corresponding apertures 42 of the frame 12. The carrying arms 58 and 60 can also have a strap securing element 74 positioned thereon. The arms 58 and 60 are connected to the connecting element 62 using a series of fasteners 76, for example locking nuts and bolts. The arms 58 and 60 are typically formed of materials similar to that of the frame 12, preferably, aluminum tubing. Preferably, a protective sleeve 78 composed of, for example, plastic or rubber, is fitted over the carrying arms 58 and 60. A protective plastic cap 80 also composed of, for example, plastic or rubber, can be used to cover the ends of the foot portions 64 and 66. A pair of pads 82 are typically mounted on the arms 56 and 58 adjacent the feet 64 and 66. The pads 82 provide a shock-absorbing system for the carrier 10 and minimize marring of the vehicle when carrier 10 is mounted to the vehicle as shown in FIGS. 2 and 3.

The connecting element 62 extends between, and preferably interconnects, the carrying arms 58 and 60 of the carrying member 14. As noted above, it is the interconnection of the connecting element 62 and the carrying arms 58 and 60 that gives the carrying member 14 a substantially H-shaped configuration. In operation, the connecting element 62 acts to maintain the carrying arms 58 and 60 in a substantially parallel disposition.

The connecting element 62 has an intermediate portion 84 and a pair of ends 86 and 88. Typically, one of the ends 88 of the connecting element 62 is secured to the carrying arm 58 using fasteners 76. The other end 86 of the connecting element 62 is generally connected to the carrying arm 60 using fasteners 76. The ends 86 and 88 of the connecting element 62 are preferably connected to each of the carrying arms 58 and 60 at a location adjacent to the apertures 72 for pivotally connecting the carrying 58 and 60 arms to the frame 12. The intermediate portion 84 extends between the two ends 86 and 88 and preferably is sized and shaped so as to be capable of spanning the face of the spare tire 30 mounted on the outside of the motor vehicle 32.

The supporting member 16 is a substantially U-shaped member comprising a pair of legs 90, 92 and a rear foot bar 94. The legs 90 and 92 are bent so that each has an upper portion 96 and 98 and a lower portion 100 and 102. Lower portions 100 and 102 extend obliquely from the upper portions 96 and 98. A protective boot 104 manufactured from, for example, plastic or rubber, is fitted over the end of upper portions 96 and 98. Stop elements 106 are defined by the bends at the junctions of the upper portions 96 and 98 and the lower portions 100 and 102. The stop elements 106 restrict and limit the rotational movement of the supporting member 16 relative to the frame 12. In particular, the stop elements 106 maintain the supporting member 16 substantially perpendicular to the frame 12 when the carrier 10 is moved to its extended, operational configuration from its collapsed, stored configuration. Finally, each of the upper portions 96 and 98 includes an aperture 108 sized to receive a pin, bolt or other fastener 48 which rotatably connects the frame 12 to the supporting member 16. Accordingly, the apertures 108 are positioned such that upon assembly of the foldable carrier 10 they are in alignment with the corresponding aperture 46 of the frame 12. A pair of feet 110 are typically mounted on the rear foot bar 94. Typically, the supporting member 16 is manufactured from aluminum tubing.

A strap 112, preferably manufactured from nylon, is attached to each of the arms 58 and 60 of the carrying member 14. In operation, the strap 112 is utilized in order to secure the carrier 10 to, for example, the roll bar of 114 the motor vehicle 32. The strap 112 can include a first portion, which secures the carrier 10 to the vehicle 32, and a second portion, used to secure items to the carrying member 14. Each strap 112 is attached to the buckle 74. The buckles 74 are connected to arms 58 and 60 using fasteners 44. The straps 112 are then threaded through the buckles 74 and fastened thereto using techniques familiar to those skilled-in-the-art. The strap 112 is sized so that it has the requisite strength for securing the carrier 10 to the vehicle 32 while remaining capable of being secured to the buckles 74 positioned on the arms 58 and 60. The strap 112 is typically between two and three feet long.

A second strap 130, preferably manufactured from nylon, encircles the cross-member 28 of the frame 12 and the support member 16. In operation, the strap 130 is utilized in order to secure the carrier 10 to, for example, the bumper or undercarriage 140 of the motor vehicle 32. The strap 130 can include a hook 132 which secures the strap 130 to the undercarriage 140. The strap 130 has a buckle 134 used to adjust the length of the strap 130. The strap 130 is threaded through the buckle 134 using techniques familiar to those skilled-in-the-art. The strap 130 is sized so that it has the requisite strength for securing the carrier 10 to the vehicle 32. The strap 130 is typically between two and three feet long.

A locking element 18 extends between each of the carrying arms 58 and 60 and the frame 12. Each of the locking elements 18 generally includes an arm element 116. The arm element 116 typically is an aluminum rod having a first segment 52, a shank 118, and a L-shaped end 120. The first segment 52 is sized to be positioned in the apertures 50 of the frame 12. The first segment 52 includes a first section that is oriented perpendicular to the shank 118 and sized to extend within and through the frame 12. At the end of the first section is a bend that defines a second section. The angle of the bend between the first section and the second section is selected so that when the carrier 10 is in its extended, operational position, as shown in FIGS. 2 and 3, the second section will be oriented parallel to the legs 24 and 26 of the frame 12. The shank 118 has a length such that the end 120 can be appropriately positioned in the aperture 122 in the ends 86 and 88 of the intermediate section 62 of the carrying member 14 when the carrier 10 is in its extended, operational position. Typically, the shank 118 is between four and five inches in length. The end 120 is generally L-shaped so as to permit positioning of the ends 120 of the arms element 116 in the apertures 122.

In operation, the locking elements 18 lock the frame 12 and carrying member 14 in a relatively perpendicular disposition. In order to collapse the carrier 10, the ends 120 of the locking elements 18 are removed from the apertures 122 in the carrying member 14. As the carrier 10 collapses to its stored position, the arm elements 116 fold back so as to move into substantially side-by-side relation with the frame 12 and carrying member 14. When, however, the carrying member 14 is pivoted to its operative, extended position as shown in FIGS. 2 and 3, the arm elements 116 swing outward so that they can be positioned in the apertures 122 in the carrying member 14. Once the frame 12 and carrying member 14 are in a substantially perpendicular relation, the ends 120 of the arm elements 116 can be positioned in the apertures 122 in the carrying member 14.

The foldable carrier 10 is moved from its collapsed, stored position shown in FIG. 1 to its extended, operational position shown in FIGS. 2 and 3 by pivoting the carrying member 14 and supporting member 16. In particular, the carrying member 14 and supporting member 16 are pivoted until they are oriented substantially perpendicular to the frame 12. With regard to the locking element 18, as the carrying member 14 moves into its extended position, the arm element 116 swings free. Once all of the elements of the carrier 10 are properly positioned, the locking element 18 can be positioned as necessary. Concurrently, the supporting member 16 pivots until stop elements 106 contact the frame 12, thus also securing the supporting member 16 in a position substantially perpendicular to the frame 12. Once the carrying member 14 and supporting member 16 are positively locked in position, the foldable carrier 10 can be positioned on the externally-mounted tire 30 of a vehicle 32. The extended foldable carrier 10 can be secured to the vehicle 32, as shown in FIGS. 2 and 3, using a strap 112. Bicycles can then be loaded on the foldable carrier 10. In the final steps, the chosen tie-down system is utilized to secure any bicycles to the carrier 10.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. A folding carrier mountable on a motor vehicle having an externally mounted spare tire, said carrier comprising:

a frame;

a first carrying arm and a second carrying arm, each said first and second carrying arm pivotally connected to said frame, each said first and second carrying arm movable about an axis between an operative extended position and a stored collapsed position at said pivotal connection, said axes being co-axial, each of said first and second carrying arms having a first end and a second end;

a first foot extending inwardly from said first carrying arm adjacent said first end thereof and a second foot extending inwardly from said second carrying arm adjacent said first end thereof, said first and second inwardly extending feet configured to engage an inner sidewall of a spare tire mounted on the outside of the motor vehicle when said first and second carrying arms are in their operative extended positions;

a connecting means extending between and connecting said first carrying arm to said second carrying arm, said first and second carrying arms and said connecting means having a substantially H-shaped configuration, said connecting means configured to engage the spare tire mounted on the outside of the motor vehicle, said connecting means having a pair of ends, one end of said connecting means being connected to said first carrying arm at a position adjacent said pivotal connection of said first carrying arm to said frame, the other of said ends of said connecting means being connected to said second carrying arm at a position adjacent said pivotal connection of said second carrying arm to said frame, said connecting means being configured so as to secure said first and second carrying arms spaced in substantially parallel disposition relative to one another, said feet and a portion of said carrying arms and said connecting means defining a substantially C-shaped opening that is configured to fit over the spare tire mounted on the outside of the motor vehicle; and a supporting member pivotally mounted to said frame and constrained for limited rotational movement relative thereto between an extended operative position and a collapsed stored position, said supporting member configured to contact the motor vehicle when said supporting member is in its operative position and the spare tire is positioned in said substantially C-shaped opening.

2. The folding carrier of claim 1 wherein said frame includes a first leg, a second leg, and a cross member, said first carrying arm, said second carrying arm, and said supporting member being pivotally mounted on said first and second legs of said frame.

3. The folding carrier of claim 1 wherein said first foot is formed by bending an end of said first carrying arm, said first foot configured to engage the spare tire mounted on the outside of the automobile when said first carrying arm is in its operative extended position.

4. The folding carrier of claim 1 wherein said second foot is formed by bending an end of said second carrying arm, said second foot configured to engage the spare tire mounted on the outside of the automobile when said second carrying arm is in its operative extended position.

5. The folding carrier of claim 1 wherein said supporting member includes a pair of legs and a rear foot bar, each said leg having a bent terminal portion forming a foot which bears against said frame when said supporting member is in its operative extended position, said rear foot bar positioned to contact the automobile when said supporting member is in its operative extended position.

6. The folding carrier of claim 1 wherein said connecting means includes a pair of legs and an intermediate portion, said intermediate portion extending between said first carrying arm and said second carrying arm, said intermediate portion being sized and shaped so as to be capable of extending across a face surface of the spare tire mounted on the outside of the automobile.

7. The folding carrier of claim 1 further comprising a first locking means, said first locking means configured to secure said first carrying arm substantially perpendicular relative to said frame member when said first carrying arm is in its operative extended position.

8. The folding carrier of claim 7 further comprising a second locking means, said second locking means configured to secure said second carrying arm substantially perpendicular relative to said frame member when said second carrying arm is in its operative extended position.

9. A folding carrier mountable on a motor vehicle, said carrier comprising:

a frame;

a first carrying arm and a second carrying arm, said first and second carrying arms being pivotally connected to said frame, each of said first and second carrying arms being movable about an axis between an operative extended position and a collapsed stored position, said axis of said first carrying arm and said axis of said second carrying arm being co-axial, said first and second carrying arms and said frame being spaced apart and substantially perpendicular to one another when said first and second carrying arms are in their operative extended position, said first and second carrying arms and said frame being in substantially side-by-side relationship when said first and second carrying arms are in their collapsed stored position, each of said first and second carrying arms having a first end and a second end;

a first foot extending inwardly from said first end of said first carrying arm and a second foot extending inwardly from said first end of said second carrying arm, said first and second inwardly extending feet configured to engage an inner sidewall of a spare tire mounted on the outside of the motor vehicle when said first and second carrying arms are in their operative extended positions;

a connecting means extending between and connecting said first carrying arm to said second carrying arm, said first and second carrying arms and said connecting means having a substantially H-shaped configuration, said connecting means configured to engage the spare tire mounted on the outside of the motor vehicle, said connecting means having a pair of ends, one end of said connecting means being connected to said first carrying arm at a position adjacent said axis of said first carrying arm, the other of said ends of said connecting means being connected to said second carrying arm at a position adjacent said axis of said second carrying arms, said connecting means being configured so as to secure said first and second carrying arms in spaced substantially parallel disposition relative to one another, said feet and a portion of said carrying arms and said connecting means defining a substantially C-shaped opening that is configured to fit over the tire mounted on the outside of the motor vehicle; and a supporting member pivotally mounted to said frame and constrained for limited rotational movement relative thereto between an extended operative position and a collapsed stored position about a second axis, said second axis being parallel to said first axis, a portion of said supporting member pressing against said frame to prevent further movement relative to said frame when said support member is in its extended position, said supporting member and said frame being in substantially perpendicular relationship to one another when said supporting member is in its extended position, said supporting member and said frame being in a substantially side-by-side relationship when said carrying member is in its collapsed position, a foot portion of said supporting member positioned to contact the motor vehicle when said supporting member is in its operative extended position and the spare tire is positioned in said substantially C-shaped opening.

10. The folding carrier of claim 9 wherein said frame includes a first leg, a second leg, and a cross member, said first carrying arm, said second carrying arm, and said supporting member being pivotally mounted on said first and second legs.

11. The folding carrier of claim 9 wherein said first foot is formed by bending an end of said first carrying arm, said foot positioned to engage the spare tire mounted on the outside of the automobile when said first carrying arm is in its operative extended position.

12. The folding carrier of claim 9 wherein said second foot is formed by bending an end of said second carrying arm, said foot positioned to engage the spare tire mounted on the outside of the automobile when said second carrying arm is in its operative extended position.

13. The folding carrier of claim 9 wherein said supporting member includes a pair of legs and a rear foot bar, each said leg having a bent terminal portion forming a foot which bears against said frame when said supporting member is in its operative extended position, said rear foot bar positioned to contact the automobile when said supporting member is in its operative extended position.

14. The folding carrier of claim 9 wherein said connecting means includes a pair of arms and an intermediate portion, said intermediate portion extending between said first carrying arm and said second carrying arm, said intermediate portion being sized and shaped so as to be capable of extending across a face surface of the spare tire mounted on the outside of the automobile.

15. The folding carrier of claim 9 further comprising a first locking means, said first locking means configured to secure said first carrying arm at a substantially perpendicular disposition relative to said frame member when said first carrying arm is in its operative extended position.

16. The folding carrier of claim 9 further comprising a second locking means, said second locking means configured to secure said second carrying arm at a substantially perpendicular disposition relative to said frame member when said second carrying arm is in its operative extended position.

* * * * *